(12) United States Patent
McKenzie

(10) Patent No.: US 9,187,142 B2
(45) Date of Patent: Nov. 17, 2015

(54) CANTILEVER BIKE RACK

(75) Inventor: Paul McKenzie, Sainte Catherine-de-Hatley (CA)

(73) Assignee: ARKEL INC., Sherbrooke, Quebec (CA)

(*) Notice: Subject to any disclaimer, the term of this patent is extended or adjusted under 35 U.S.C. 154(b) by 248 days.

(21) Appl. No.: 13/390,750

(22) PCT Filed: Aug. 20, 2010

(86) PCT No.: PCT/US2010/046199
§ 371 (c)(1),
(2), (4) Date: Feb. 16, 2012

(87) PCT Pub. No.: WO2011/028449
PCT Pub. Date: Mar. 10, 2011

(65) Prior Publication Data
US 2012/0168479 A1    Jul. 5, 2012

Related U.S. Application Data

(60) Provisional application No. 61/236,523, filed on Aug. 24, 2009.

(51) Int. Cl.
*B62J 7/04* (2006.01)

(52) U.S. Cl.
CPC .......................................... *B62J 7/04* (2013.01)

(58) Field of Classification Search
CPC .............. B62J 9/00; B62J 9/001; B62J 9/006; B62J 9/02; B62J 7/00; B62J 7/02; B62J 7/04; B62J 11/00
USPC ................... 224/427, 419, 412, 453; 403/383
See application file for complete search history.

(56) References Cited

U.S. PATENT DOCUMENTS

| | | | |
|---|---|---|---|
| 627,225 A * | 6/1899 | Eifler | 224/455 |
| 3,802,598 A | 4/1974 | Burger et al. | |
| 3,853,253 A | 12/1974 | Hawkins et al. | |
| 4,081,117 A * | 3/1978 | Crane | 224/441 |
| 4,282,993 A | 8/1981 | Humlong | |
| 4,301,951 A | 11/1981 | Pletscher | |
| 4,328,914 A | 5/1982 | Michaud | |
| 4,350,361 A | 9/1982 | Fujii | |
| 4,410,116 A | 10/1983 | Mattei | |
| 4,477,004 A | 10/1984 | Barro | |

(Continued)

FOREIGN PATENT DOCUMENTS

| | | | |
|---|---|---|---|
| DE | 2946353 A1 | 11/1979 | |
| DE | 3513878 A1 | 4/1985 | |

OTHER PUBLICATIONS

International Search Report.

*Primary Examiner* — Justin Larson
*Assistant Examiner* — Scott McNurlen
(74) *Attorney, Agent, or Firm* — Norton Rose Fulbright Canada LLP

(57) ABSTRACT

Bikes typically include a seat that has a seat member that extends along a bottom portion of the seat. A rack for such a bike includes a bracket, a platform, a clamp, and a hand operated quick connector. The bracket includes a platform side for connection to the platform. The bracket also includes a clamp side that has the clamp configured for providing a clamped connection to the seat member. The hand operated quick connector is located on the platform side and/or on the clamp side.

19 Claims, 22 Drawing Sheets

(56) References Cited

U.S. PATENT DOCUMENTS

| | | | | |
|---|---|---|---|---|
| 4,537,338 A | | 8/1985 | Belka | |
| 4,566,617 A | | 1/1986 | Jackson | |
| 4,596,346 A | | 6/1986 | Lepage | |
| 4,643,343 A | * | 2/1987 | Goldman et al. | 224/275 |
| 4,848,020 A | * | 7/1989 | Lash | 43/17.2 |
| 4,964,551 A | | 10/1990 | O'Donovan et al. | |
| 5,090,717 A | | 2/1992 | Belka | |
| 5,127,563 A | * | 7/1992 | Chan et al. | 224/438 |
| 5,135,143 A | * | 8/1992 | Naughton | 224/416 |
| 5,167,353 A | | 12/1992 | Hughes | |
| 5,190,345 A | | 3/1993 | Lin | |
| 5,257,727 A | | 11/1993 | Chen | |
| 5,303,944 A | | 4/1994 | Kalmus | |
| 5,322,311 A | | 6/1994 | Dunn | |
| 5,332,134 A | | 7/1994 | Chen | |
| 5,341,971 A | | 8/1994 | Newbold et al. | |
| 5,356,058 A | * | 10/1994 | Fenton | 224/427 |
| 5,395,017 A | | 3/1995 | Naughton | |
| 5,411,190 A | | 5/1995 | Kortenbrede | |
| 5,482,194 A | | 1/1996 | Hallock, III | |
| 5,496,089 A | | 3/1996 | Muderlak | |
| 5,542,587 A | | 8/1996 | Broz et al. | |
| 5,573,163 A | | 11/1996 | Lee et al. | |
| 5,593,126 A | | 1/1997 | Muderlak | |
| 5,649,657 A | | 7/1997 | Chuang | |
| 5,655,694 A | * | 8/1997 | Keckeisen | 224/430 |
| 5,803,329 A | | 9/1998 | Weissenberger et al. | |
| 5,845,830 A | | 12/1998 | Dreiling | |
| 5,850,958 A | * | 12/1998 | Belanger et al. | 224/415 |
| 5,860,577 A | | 1/1999 | Dunn | |
| 5,890,759 A | | 4/1999 | Ross | |
| 5,931,361 A | | 8/1999 | Schwimmer | |
| 5,961,136 A | | 10/1999 | Tseng | |
| 6,120,050 A | | 9/2000 | Tillim | |
| 6,398,247 B1 | | 6/2002 | Kuo | |
| 6,431,422 B1 | | 8/2002 | Moore et al. | |
| 6,527,153 B1 | | 3/2003 | Manos | |
| 6,749,212 B2 | | 6/2004 | Mock et al. | |
| 6,976,690 B2 | | 12/2005 | Freeman | |
| 7,000,813 B2 | | 2/2006 | Gilstrap et al. | |
| 7,225,956 B2 | * | 6/2007 | Lien et al. | 224/427 |
| 7,273,221 B2 | | 9/2007 | Ockenden | |
| 2006/0186159 A1 | | 8/2006 | Lawrence | |
| 2006/0186160 A1 | | 8/2006 | Hubbe | |
| 2007/0068986 A1 | * | 3/2007 | Lien et al. | 224/427 |
| 2007/0090140 A1 | * | 4/2007 | Chuang | 224/427 |
| 2009/0001115 A1 | | 1/2009 | Vongnaraj | |
| 2009/0159626 A1 | | 6/2009 | Hoidal et al. | |
| 2010/0006720 A1 | * | 1/2010 | Chien-Ping | 248/201 |

* cited by examiner

CANTILEVER BIKE RACK

RELATED APPLICATIONS AND PRIORITY

This patent application claims the benefit of provisional patent application No. 61/236,523 entitled "Cantilever Bike Rack," filed 24 Aug., 2009, incorporated herein by reference.

FIELD

This patent application generally relates to bicycle racks. More particularly, it relates to a bicycle rack that is quickly mounted and dismounted from a bicycle.

BACKGROUND

A number of accessories have been developed to allow carrying loads while riding on a bicycle, and various types of bicycle racks are very common. Bicycle racks generally include a platform over which various types of bags or containers will be attached. Several methods have been used to attach the rack to the bike.

One popular bike rack configuration that has high load capacity has side legs supporting the platform. The lower sections of the legs are bolted to threaded eyelets in the bike frame in the area of the wheel axle. The weight carried by the platform is borne by these legs. In addition, the platform may have top stays that connect to a higher section of the bicycle to prevent the platform from moving forward or rearward.

Another type of bike rack has a cantilever configuration and is often referred to as a "seat post" rack or a "beam" rack. These types do not have legs connected to the bike frame. They have a single point of attachment to the seat post, and the seat post bears all the cantilevered weight. The attachment is made by way of a somewhat heavy bracket that clamps around the seat post. Seat post racks have advantage in that they can be installed and removed quickly. Some models do not require the use of any tools to install or remove. Also, seat post racks can be installed on bikes in which the bike frame is not equipped with the threaded eyelets to which rack legs would otherwise be attached. Seat post racks can also be installed on bikes that have disc brakes or suspension equipped bikes where the rack legs or its connections may interfere with other components of the bike.

However seat post racks have limited carrying capacity because the cantilever configuration induces a torque that generates high localized stress on the seat post and that tends to bend the seat post. Therefore, the carrying capacity of seat post racks has been lower then that of regular legged bike racks. Platforms of seat post racks have also tended to rotate about the seat post axis. This rotation could only be countered by providing greater friction of the seat post rack bracket against the seat post. The seat post rack bracket needed to be very tight against the seat post to generate sufficient friction to prevent the platform from so rotating. Fairly heavy brackets were therefore needed and the large clamping force of the bracket to the seat post damaged the seat post finish and tended to crush the seat post material. Thus, seat post racks were not suitable for thin aluminum tubing seat posts or the newer carbon fiber seat posts.

A carrier rack described in U.S. Pat. No. 5,395,017 to Naughton describes a rack for easy attachment and removal from a standard bicycle seat that includes a seat post abutment fork and a rail hanger. The seat post abutment fork is configured to at least partially encircle and abut the seat post. The rail hanger has arms that extend over the saddle rails of a standard bicycle seat at a pivot position near the knees of the rails so as to support the weight of the rack and its burden in a hanging fashion. While the pivoting rail hanger allows quick connection and disconnection to the seat rails it does not provide a sufficiently secure connection. Therefore further improvement in bicycle racks was needed and these improvements are provided by the present patent application.

SUMMARY

Bikes typically include a seat that has a seat member that extends along a bottom portion of the seat. One aspect of the present patent application is a rack for such a bike. The rack includes a bracket, a platform, a clamp, and a hand operated quick connector. The bracket includes a platform side for connection to the platform. The bracket also includes a clamp side that has the clamp configured for providing a clamped connection to the seat member. The hand operated quick connector is located on the platform side and/or on the clamp side.

Another aspect of the present patent application is a bike rack for such a bike that includes a platform, a bracket, and a rotatable member. The bracket is configured for at least temporary immovable connection to the seat member. The rotatable member is between the bracket and the platform. The rotatable member is configured for adjusting angle of the platform around a horizontal axis.

Another aspect of the present patent application is a bike rack for a bike having a seat and a seat post, in which the seat is mounted on the seat post. The bike rack includes a platform, a first connecting device, and a second connecting device. The first connecting device includes a first clamp for clamp mounting the platform to the seat and the second connecting device includes a second clamp for clamp mounting the platform to the seat post.

BRIEF DESCRIPTION OF DRAWINGS

The foregoing will be apparent from the following detailed description as illustrated in the accompanying drawings, for clarity not drawn to scale, in which.

DETAILED DESCRIPTION

Figure 1:
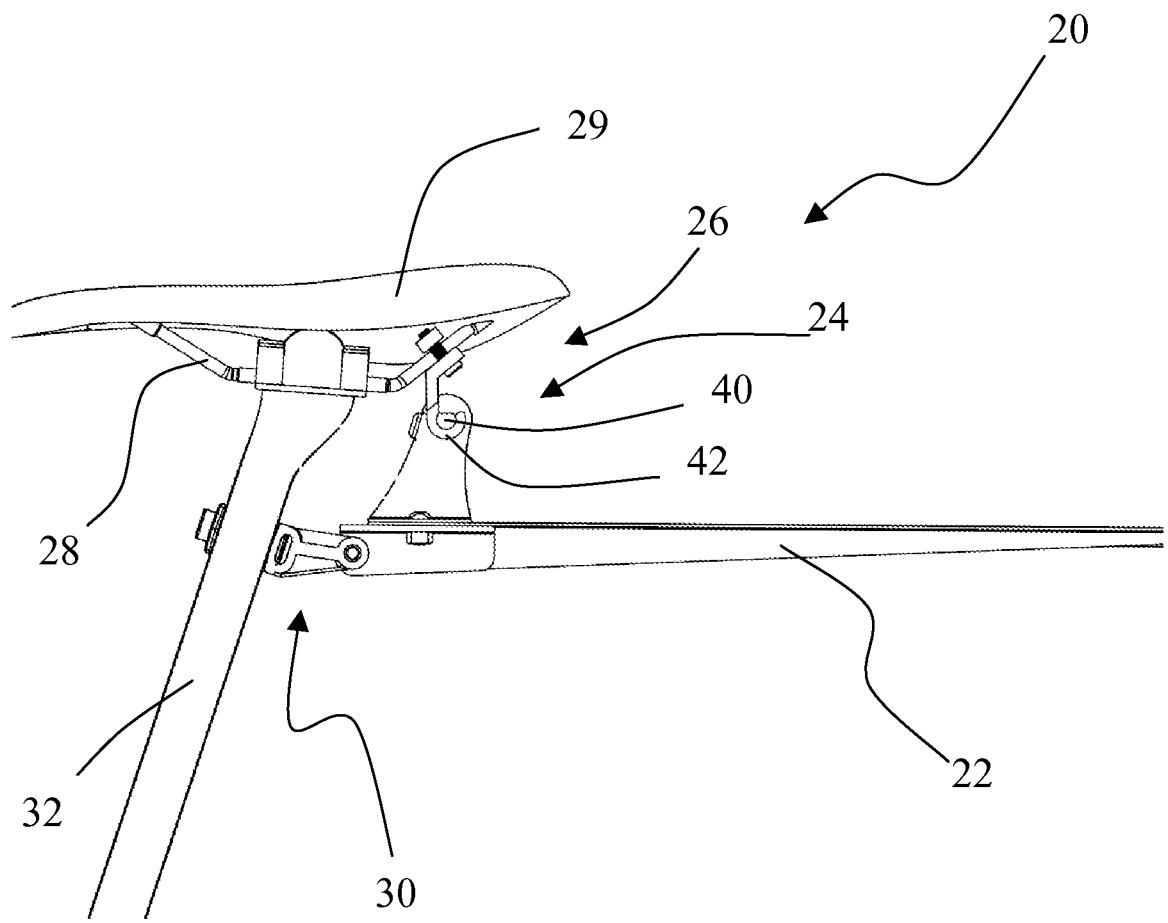
FIG. 1 is a cross sectional view showing one embodiment of a bike rack and its mounting to seat rails and to seat post.

In one embodiment, cantilever bike rack 20 includes rack platform 22 and its pivotal mounting 24 to bracket 26, as shown in FIG. 1. Bracket 26 clamps to a seat member extending along a bottom portion of the seat, such as seat rails 28 of bike seat 29. The seat member can also be one or more crossbars. Any other structural element extending along a bottom portion of the seat can be used. Bike rack 20 also includes pivotal and adjustable mounting 30 to seat post 32. Seat rails 28, bracket 26, and pivotal mounting 24 bear the weight of rack platform 22 and any load it carries. Position of rack platform 22 over the rear wheel of the bike is provided by bracket 26 and pivotal mounting 24 and is stabilized through pivotal and adjustable mounting 30 to seat post 32. While pivotal and adjustable mounting 30 to seat post 32 prevents longitudinal motion of platform 22, pivotal and adjustable mounting 30 to seat post 32 allows angle of rack platform 22 over the rear wheel of the bike to be set parallel to the ground.

Figure 2A:
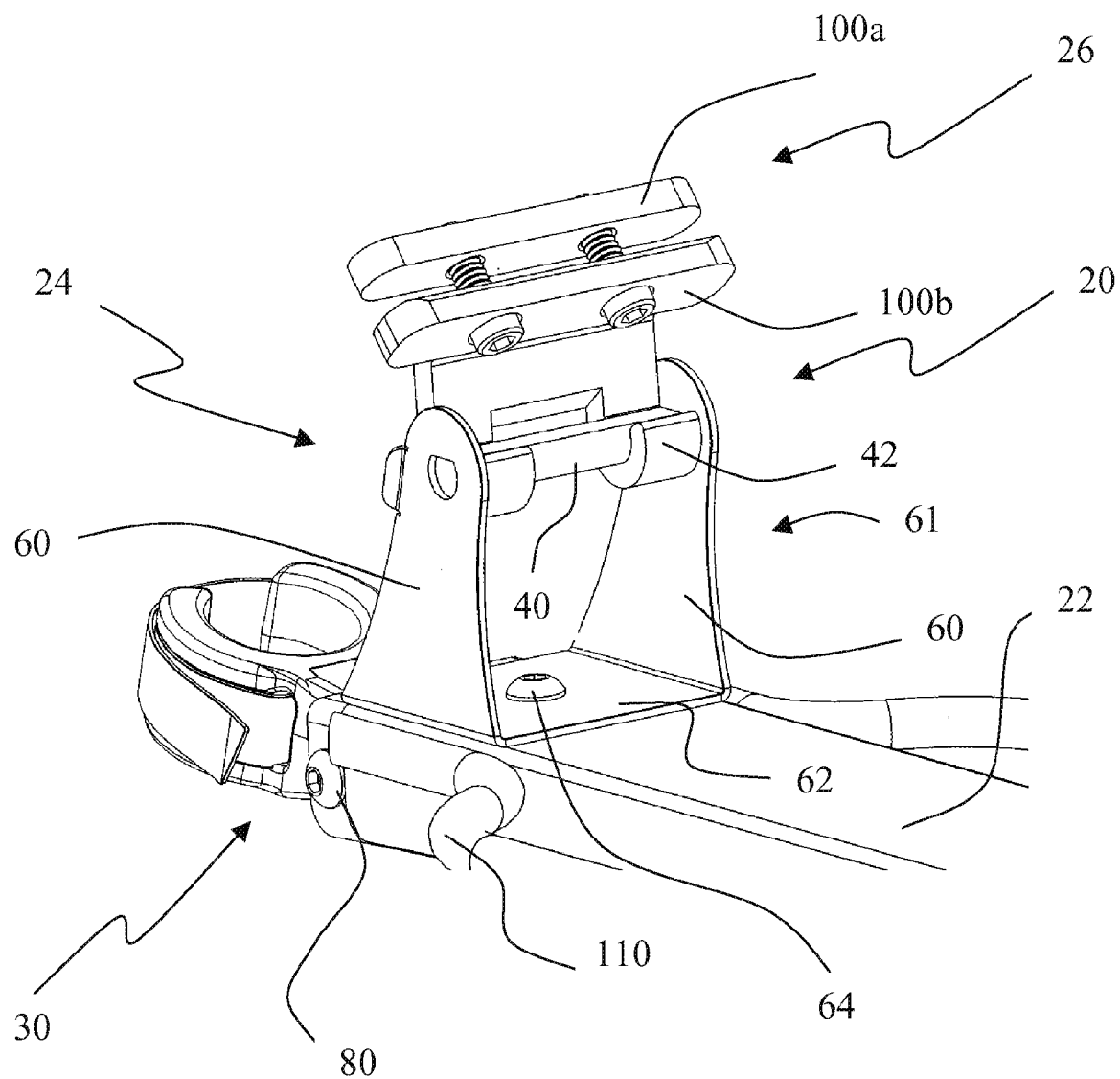
FIG. 2a is a three dimensional view of a portion of the bike rack of FIG. 1 showing how it is mounted to the seat rails and to the seat post.
Figure 2B:
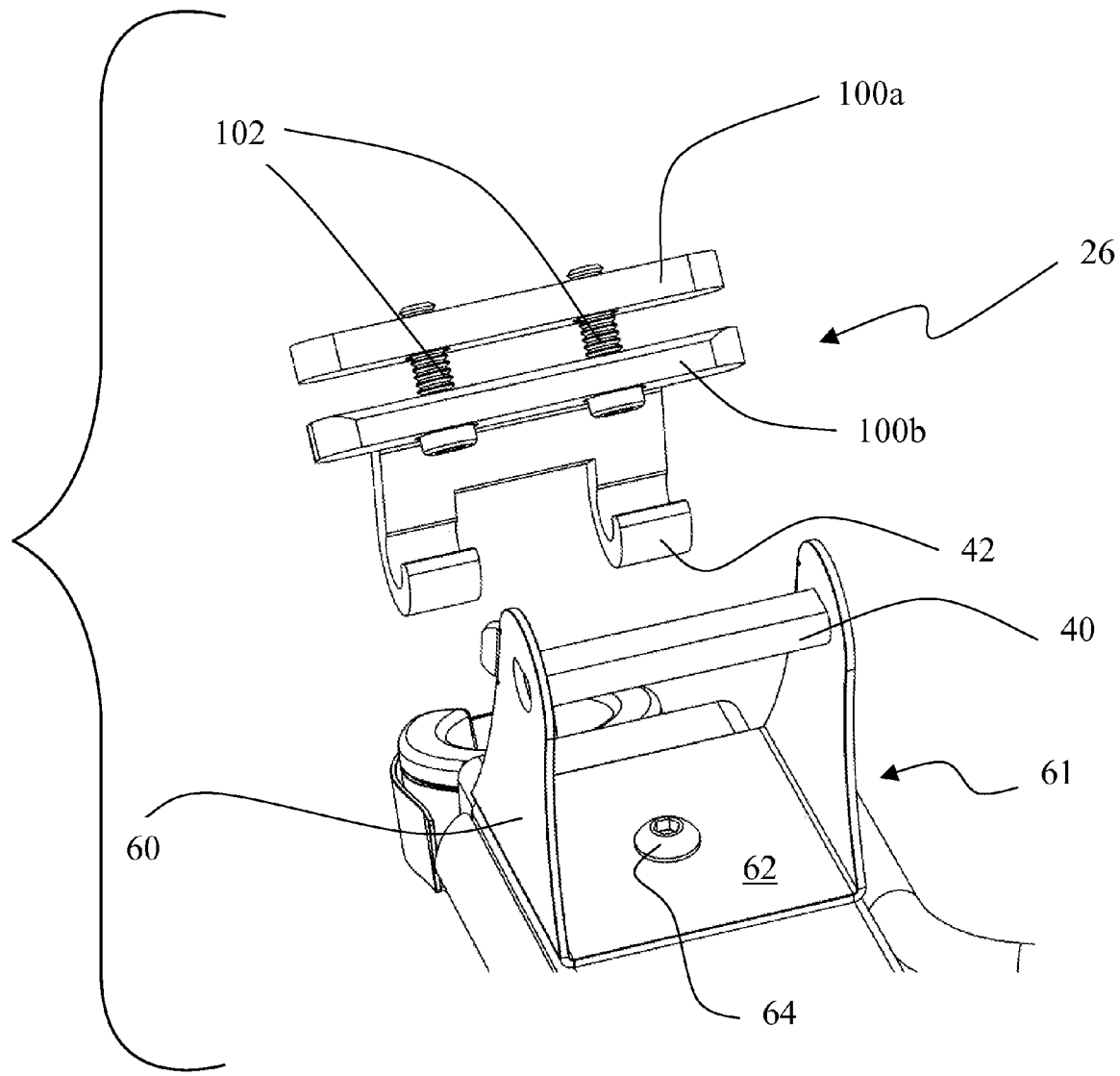
FIG. 2b is a three dimensional view showing quick disconnection of the rack platform of FIG. 1 from the bike.
Figure 3A:
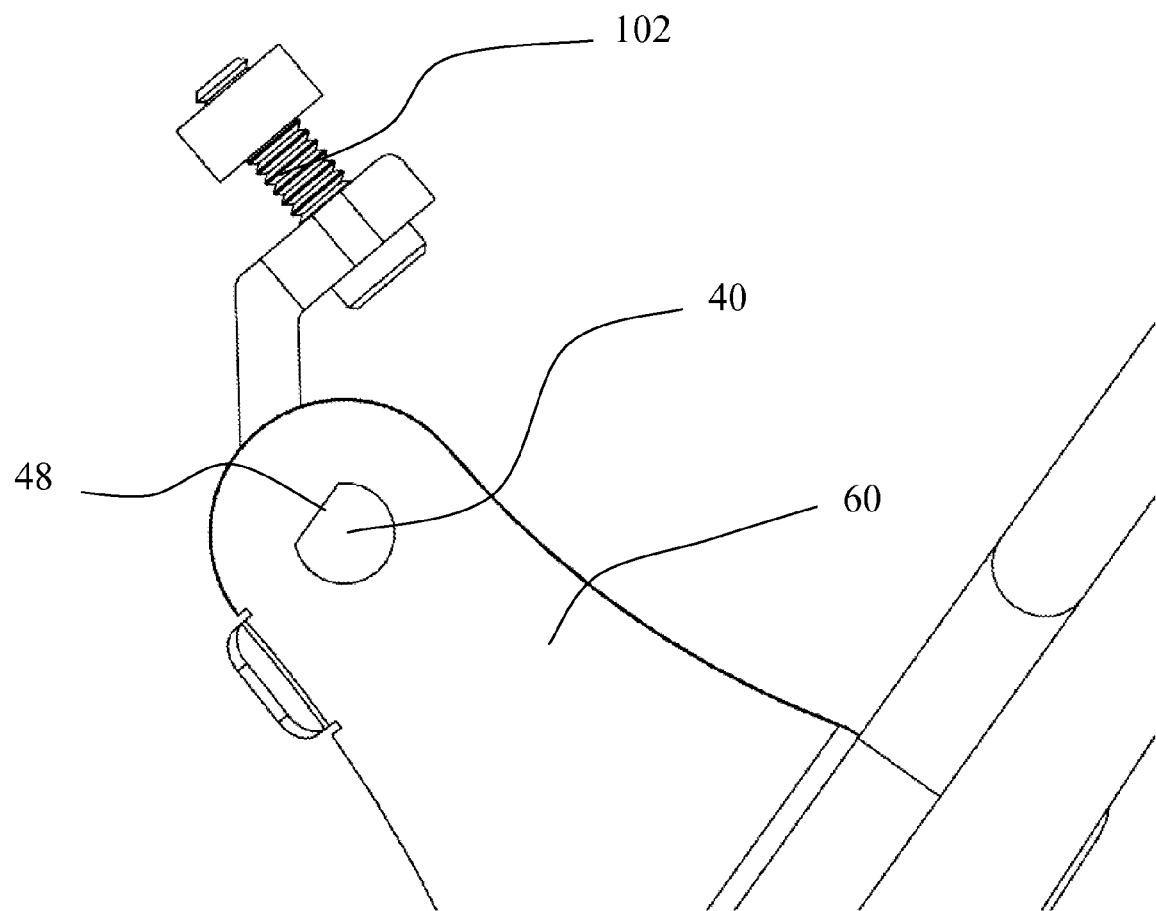
FIG. 3a is a side view showing quick connection or disconnection of the tilted rack platform of FIG. 1 from the bike.
Figure 3B:
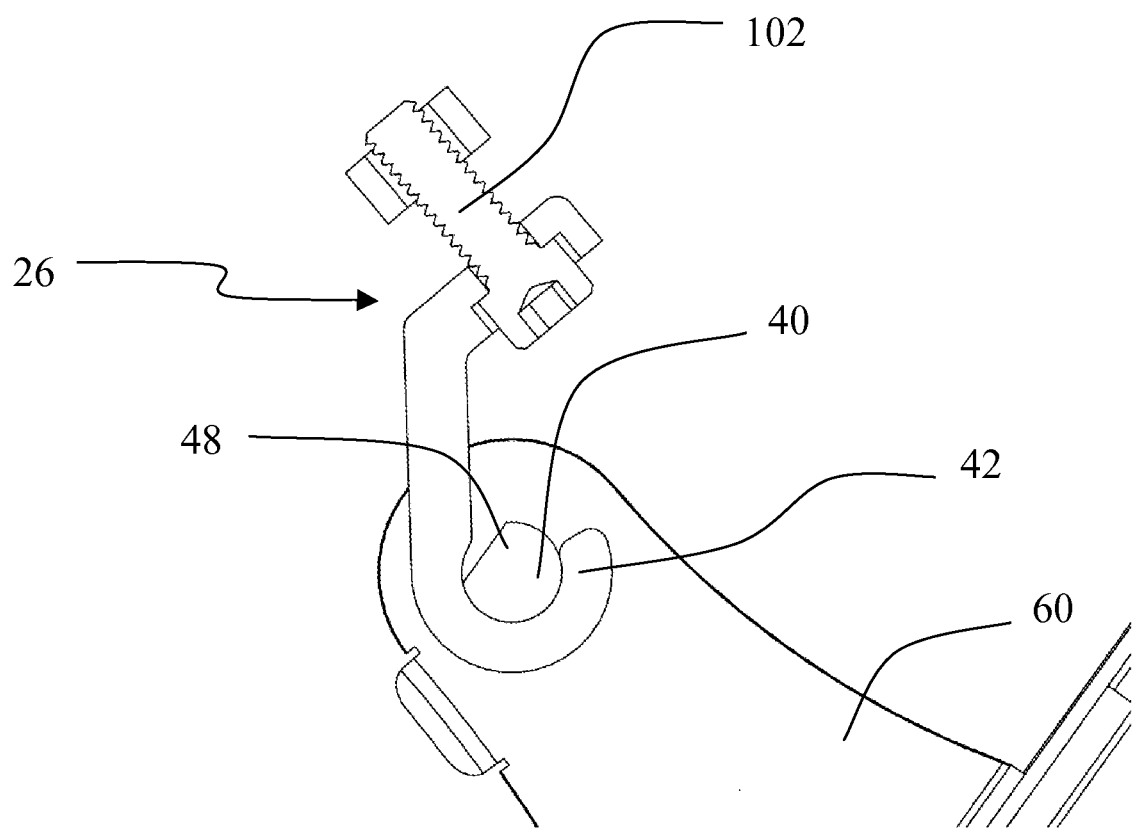
FIG. 3b is a cross sectional view showing quick connection or disconnection of the tilted rack platform of FIG. 1 from the bike.

Pivotal mounting 24 to bracket 26 includes separable pivoting connector pin 40 and bearing 42. Pivoting connector pin 40 is separable from bearing 42, enabling quick hand operated separation of most portions of bike rack 20 from the bike while bracket 26 remains clamped to seat rails 28, as shown in FIGS. 2a, 2b. Removal of pivoting connector pin 40 from bearing portion 42 of bracket 26 is accomplished by lifting end 44 of rack platform 22 by hand, so pivoting connector pin 40 rotates to a position at which pin 40 can be removed from bearing 42, as shown in FIGS. 3a, 3b and in FIGS. 4a-4c. Pivoting connector pin 40 has flat 48. Removal is prevented when rack platform 22 is parallel to the ground and flat 48 is in the position shown in FIG. 3c. Removal is enabled only when flat 48 has rotated sufficiently.

In this embodiment, pivoting connector pin 40 is supported at each end by side sections 60 of pivot support member 61. Pivot support member 61 also includes bottom section 62 that is mounted to rack platform 22 with connector pin support bolt 64.

Figure 5A:
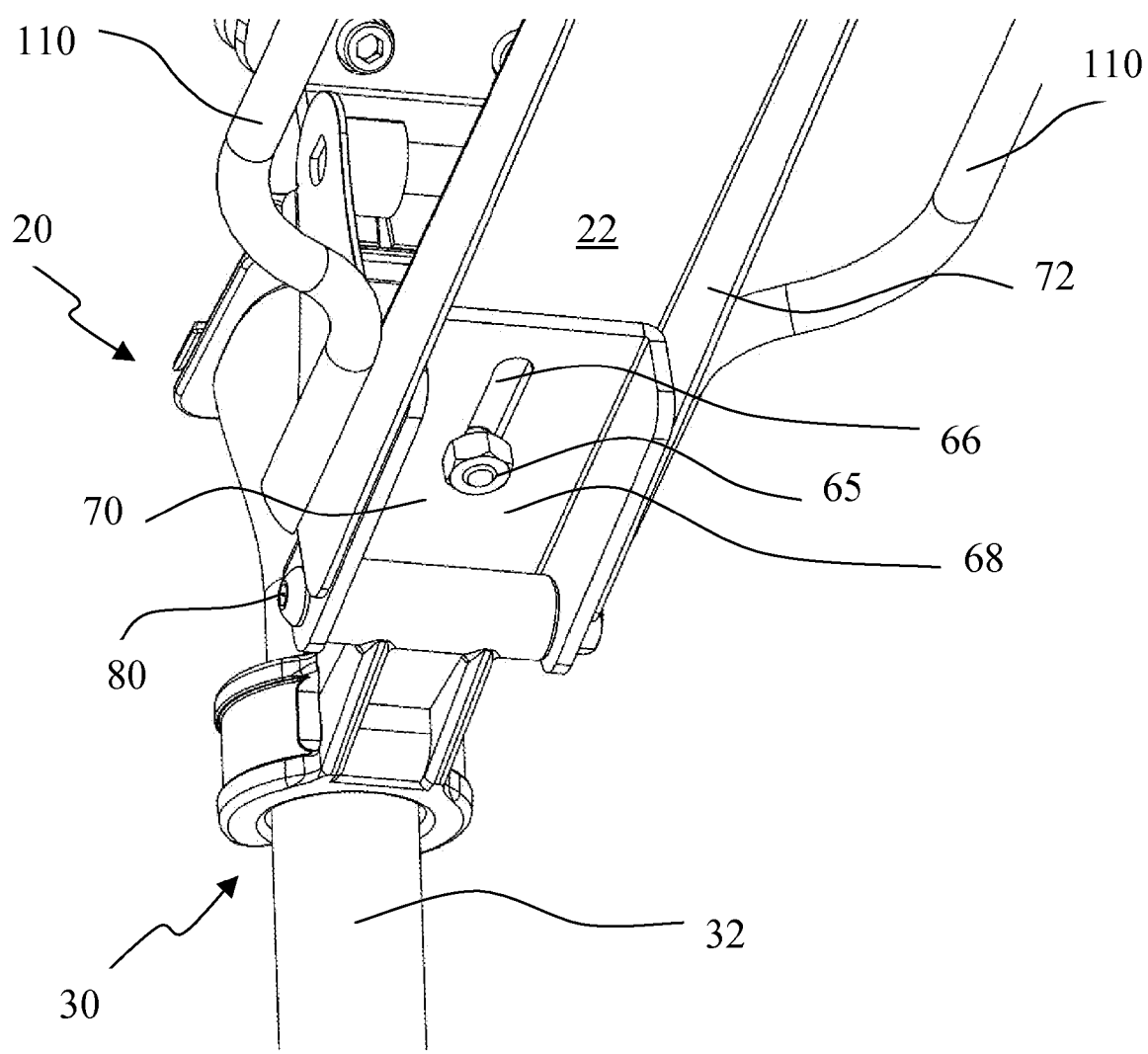
FIG. 5a is a three dimensional view of the bike rack of FIG. 1 showing details of a length varying connector of the rack platform to the seat post.
Figure 5B:
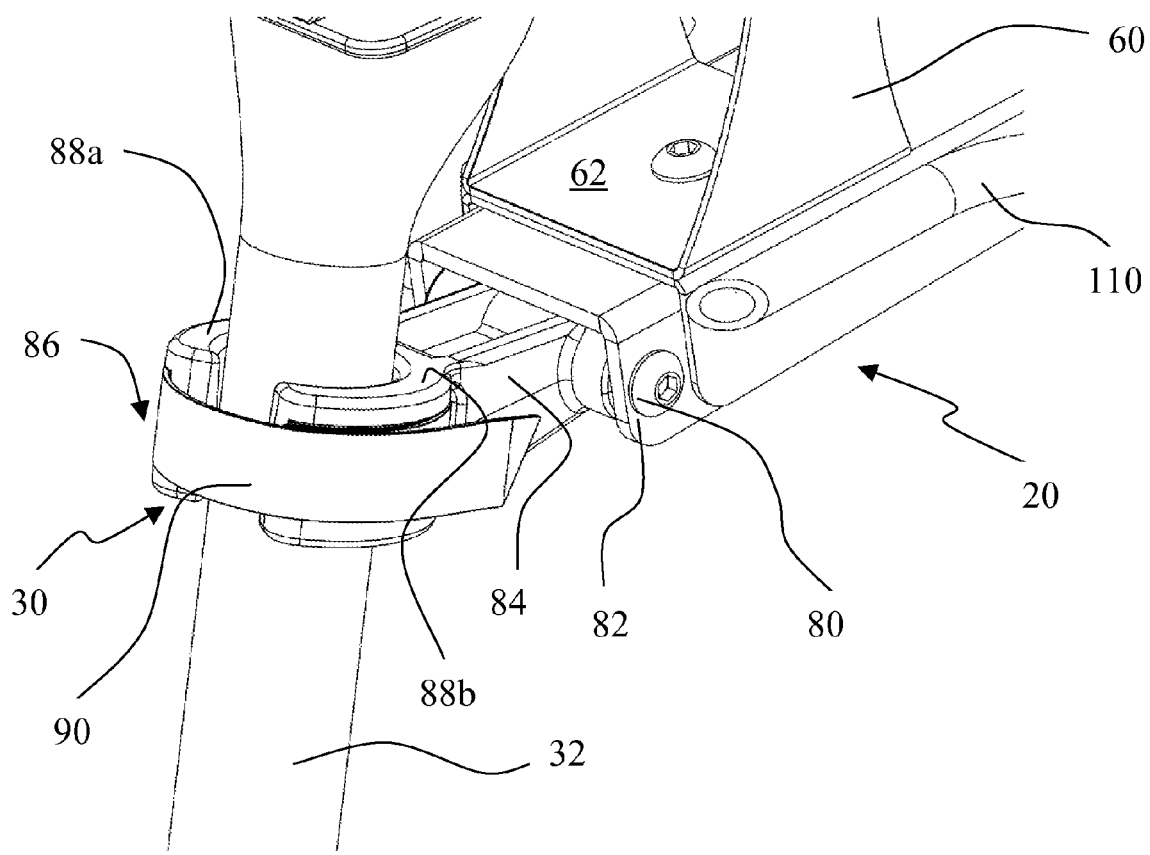
FIG. 5b is a three dimensional view of the bike rack of FIG. 1 showing details of the clamp connector of the rack platform to the seat post.
Figure 5C:
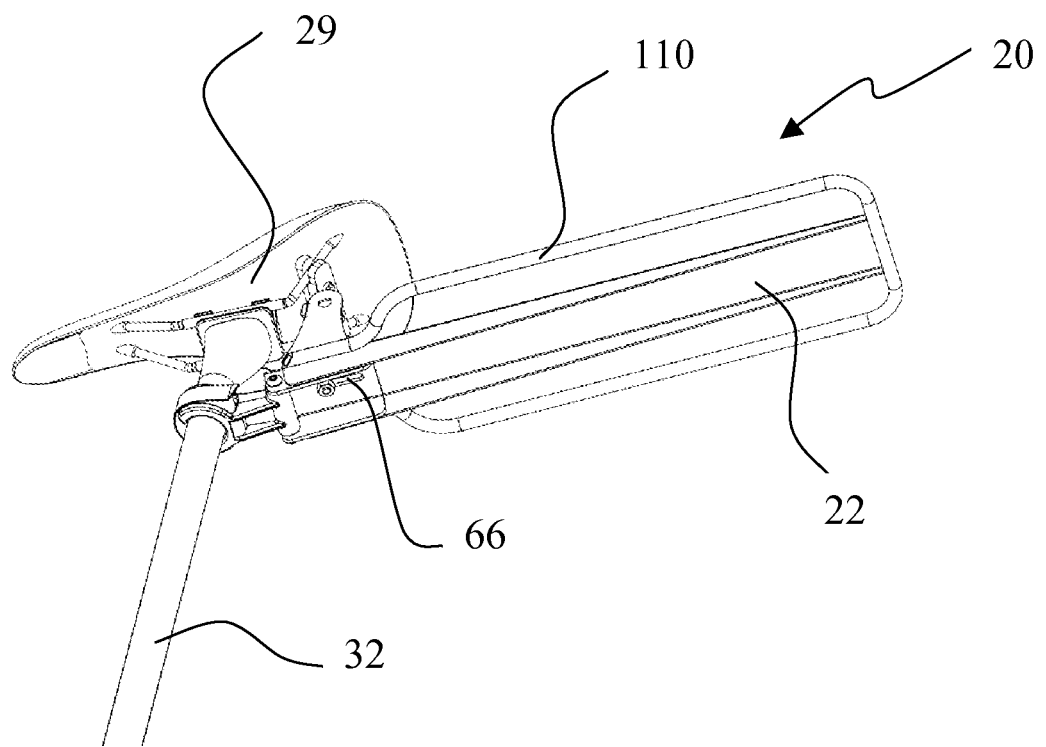
FIGS. 5c and 5d are three dimensional views of the bike rack of FIG. 1 showing a tubular rack frame connected to the rack platform.
Figure 5D:
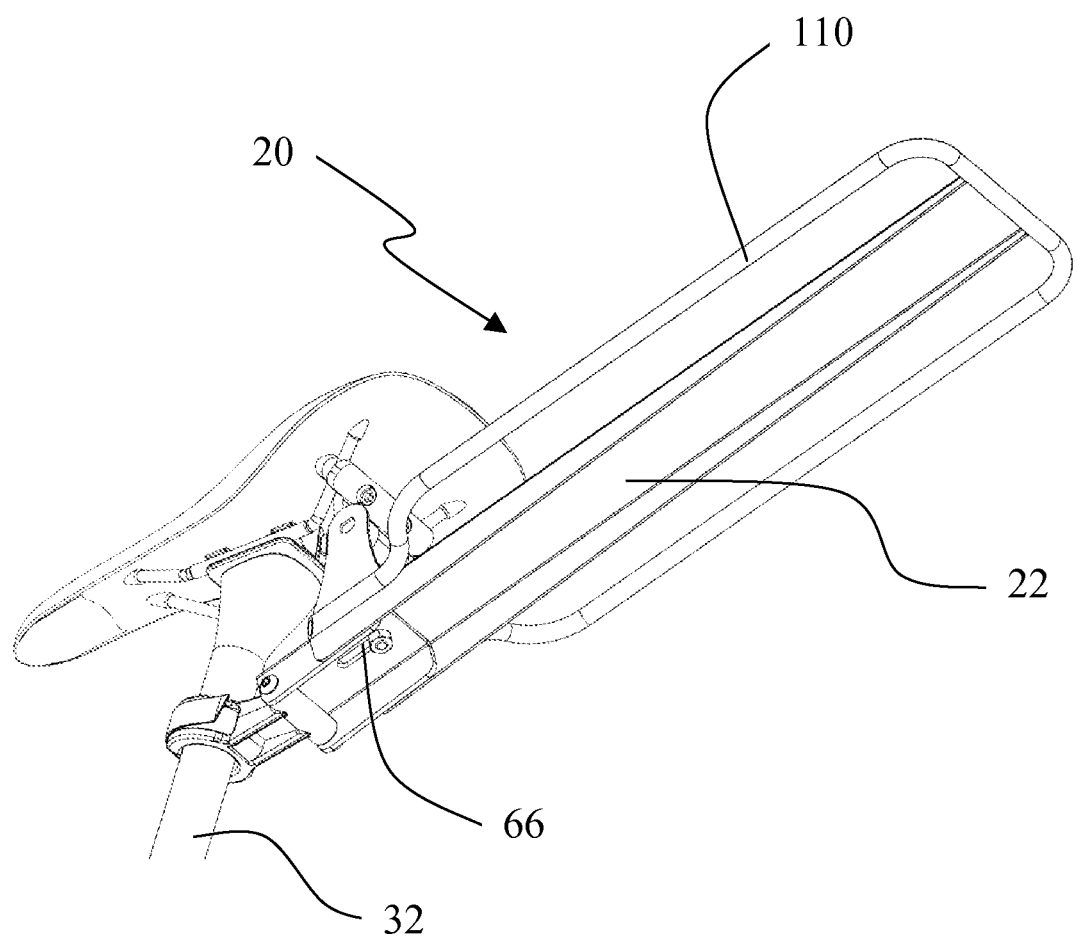

Connector pin support bolt 64 extends through holes in bottom section 62 of pivot support member 61 and rack platform 22. Connector pin support bolt 64 also extends through slot 66 in top section 68 of U-shaped seat post clamp support 70, as shown in FIGS. 5a, 5b. Seat post clamp support 70 fits within sidewalls 72 of U-shaped rack platform 22. Slot 66 permits adjustment of location of rack platform 22 and pivot support member 61 relative to U-shaped seat post clamp support 70 so rack platform 22 can be rotated so it is parallel to the ground, as shown in FIGS. 5c, 5d. Bolt 64 is then tightened to nut 65 to keep rack platform 22 parallel to the ground. Slot 66 allows adjustment to provide platform 22 parallel to the ground.

Seat post clamp bolt 80 extends through holes (not visible) that extend through sidewalls 82 of U-shaped seat post clamp support 70, as also shown in FIGS. 5a and 5b. Seat post clamp bolt 80 also extends through holes (not visible) that extend through seat post clamp extensions 84, pivotally connecting seat post clamp 86 to sidewalls 82 of U-shaped seat post clamp support 70.

Pivotal and adjustable mounting 30 to seat post 32 includes seat post clamp 86 which has seat post clamp arms 88a, 88b, velcro strap 90, and velcro pad (not visible), as shown in FIG. 5b. Seat post clamp 86 and its seat post clamp arms 88a, 88b are made of a rubber or plastic material, such as thermoplastic urethane (TPU). The TPU is formulated to have a hardness that allows seat post clamp arms 88a, 88b to bend open easily, so they can extend around seat post 32, but stiff enough to spring back and hold seat post 32.

Figure 6:
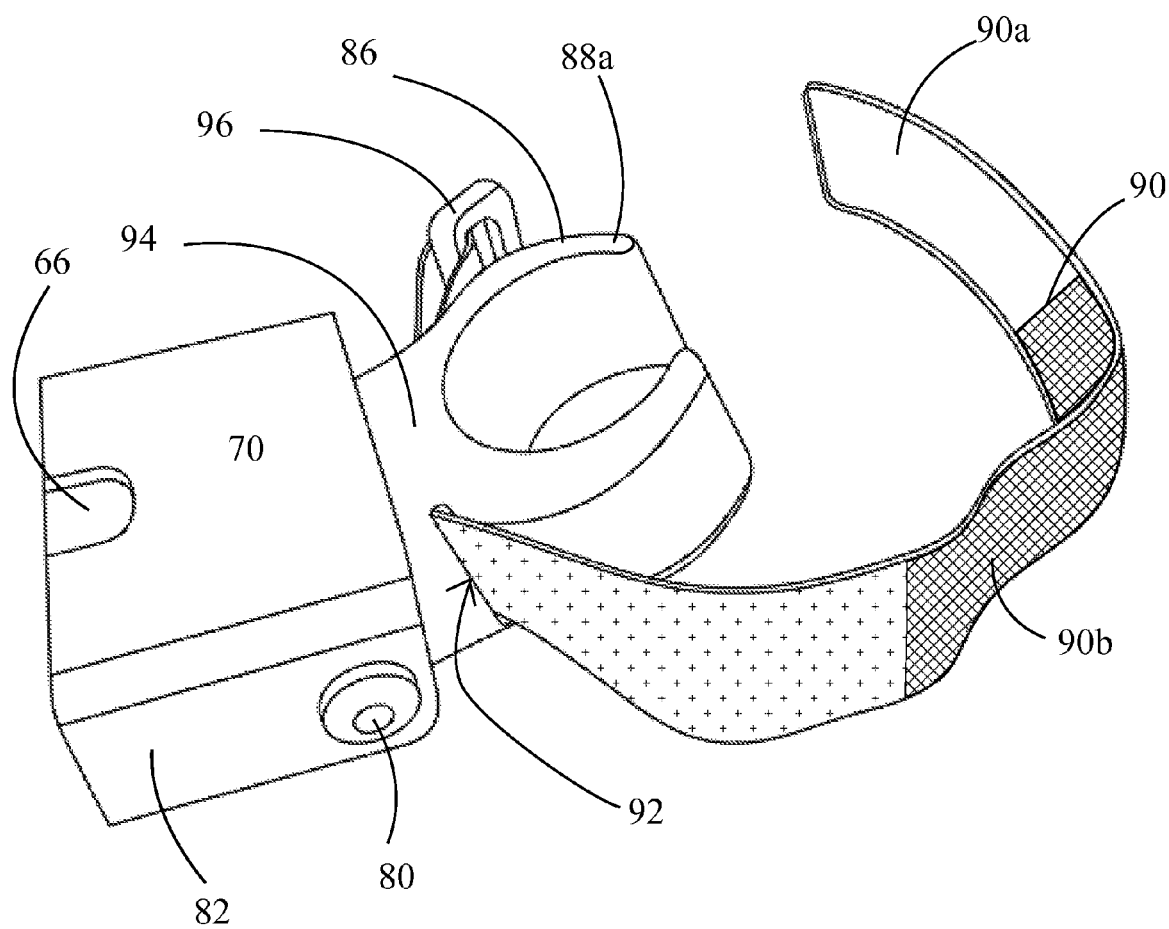
FIG. 6 is a three dimensional view of the bike rack of FIG. 1 showing details of the clamp connector of the rack platform to the seat post.

Velcro strap 90 includes Velcro 90a, 90b sewn onto front and back surfaces of a nylon strap, as shown in FIG. 6. Velcro strap 90 is inserted through slot 92 extending through the back portion 94 of seat post clamp 86. One end of Velcro strap 90 is sewn for attachment to rectangular plastic loop 96, such as a nylon loop. The other end of Velcro strap 90 extends around seat post clamp arms 88a, 88b, is inserted through the nylon loop and is then pulled back, tightened, and Velcro 90a is connected to mating portion Velcro 90b of Velcro strap 90. When first installed, tightening Velcro strap 90 aligns seat post clamp 86 with seat post 32, rotating seat post clamp 86 around a pivot provided by seat post clamp bolt 80. When tightened, Velcro strap 90 prevents further rotation of rack platform 22 around either pivoting connector pin 40 or seat post clamp bolt 80. Other seat post clamp tightening schemes can be used, such as an elastic or rubber strap that wraps around seat post clamp 86. The elastic or rubber strap is held in position with a connector, such as a hook. Alternatively a rachet type band can be used. In yet another alternative, a bolt with a hand operated lever is used. Such hand operated lever devices are commonly found for tightening wheels onto bikes.

Figure 4A:
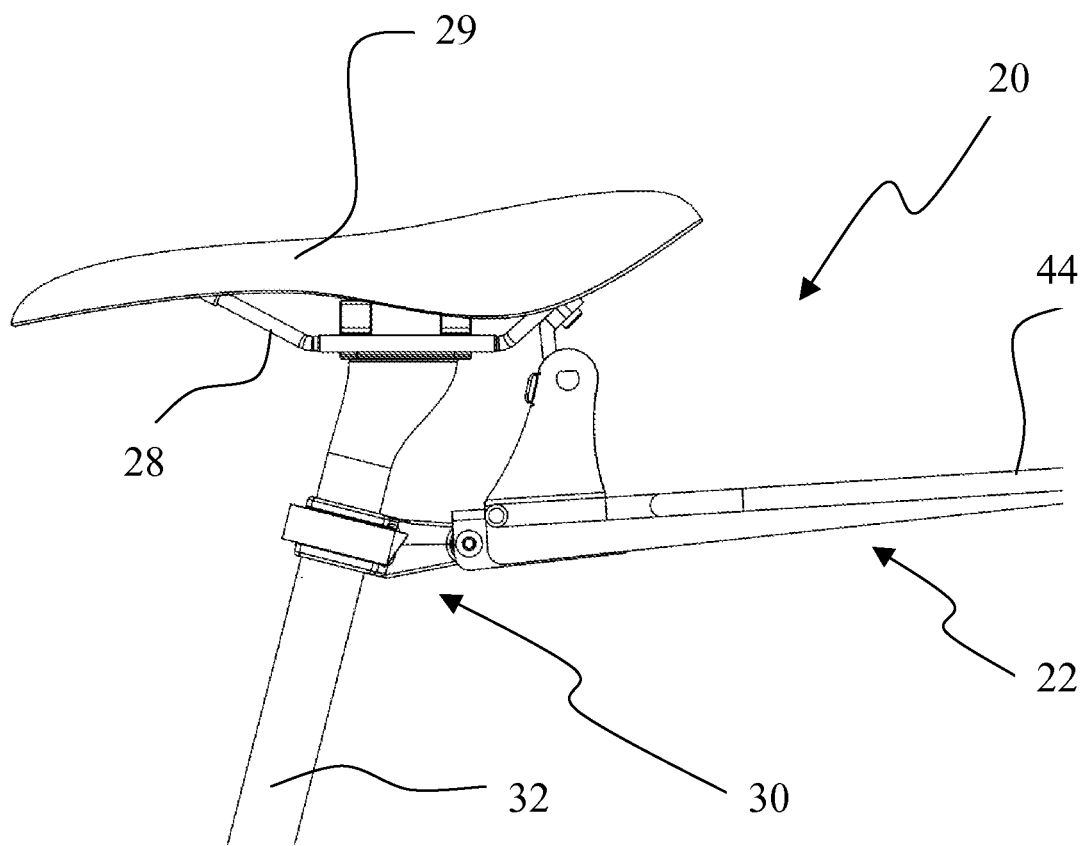
FIG. 4a is a side view showing the embodiment of the bike rack and its mounting to the seat rails and to the seat post of FIG. 1.
Figure 4B:
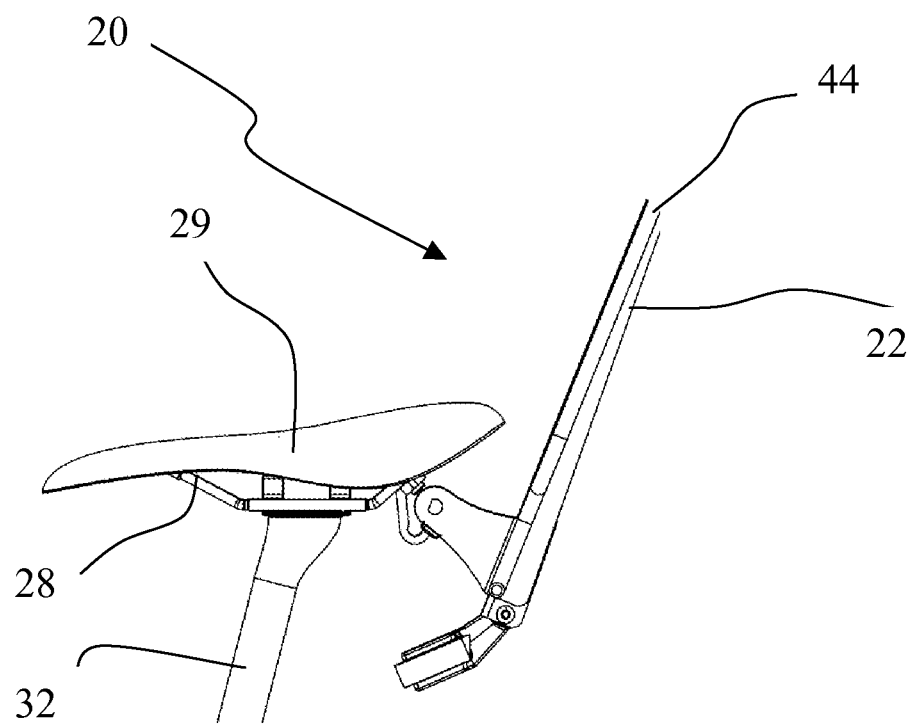
FIGS. 4b and 4c are side views showing steps in the removal of the bike rack of FIGS. 1 and 4a from the seat post and the seat rails.

Before removal of cantilever rack 20, Velcro strap 90 is released from connection to the Velcro pad allowing platform 22 to rotate around pivoting connector pin 40 and also allowing seat post clamp arms 88a, 88b to slip off connection to seat post 32 when end 44 of platform 22 is raised, as shown in FIGS. 4a, 4b.

Figure 3C:
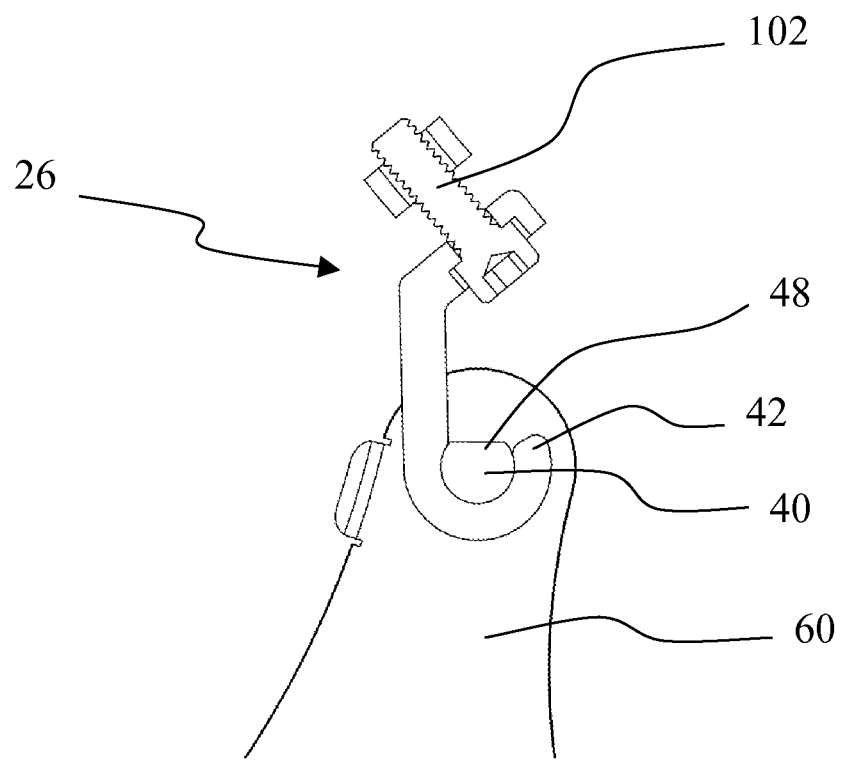
FIG. 3c is a cross sectional view showing how rotation of the rack platform secures connection of the rack platform of FIG. 1 to the bike.
Figure 4C:
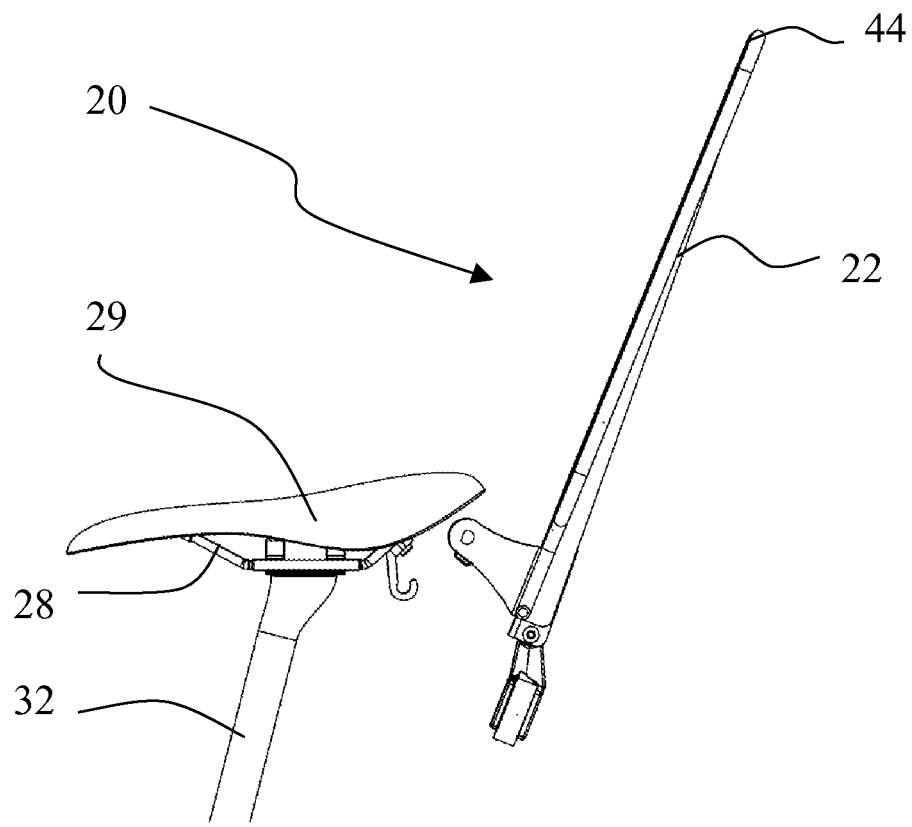

Bracket 26 includes seat rail bracket clamp members 100a, 100b, connected with seat rail bracket connector bolts 102, as shown in FIGS. 2a-2b. For mounting, seat rail bracket clamp member 100a is positioned over seat rails 28 while seat rail bracket clamp member 100b is positioned under seat rail 24. Seat rail bracket connector bolts 102 are then tightened. Seat rail bracket clamp member 100b is formed in one integral piece with bearing 42. Seat rail bracket connector screws 102 may be tightened with an Allen wrench, as shown in FIG. 3a-3c to leave bracket 26 in place connected to seat rails 28 when remaining portions of cantilever bike rack 20 are removed.

Figure 7A:
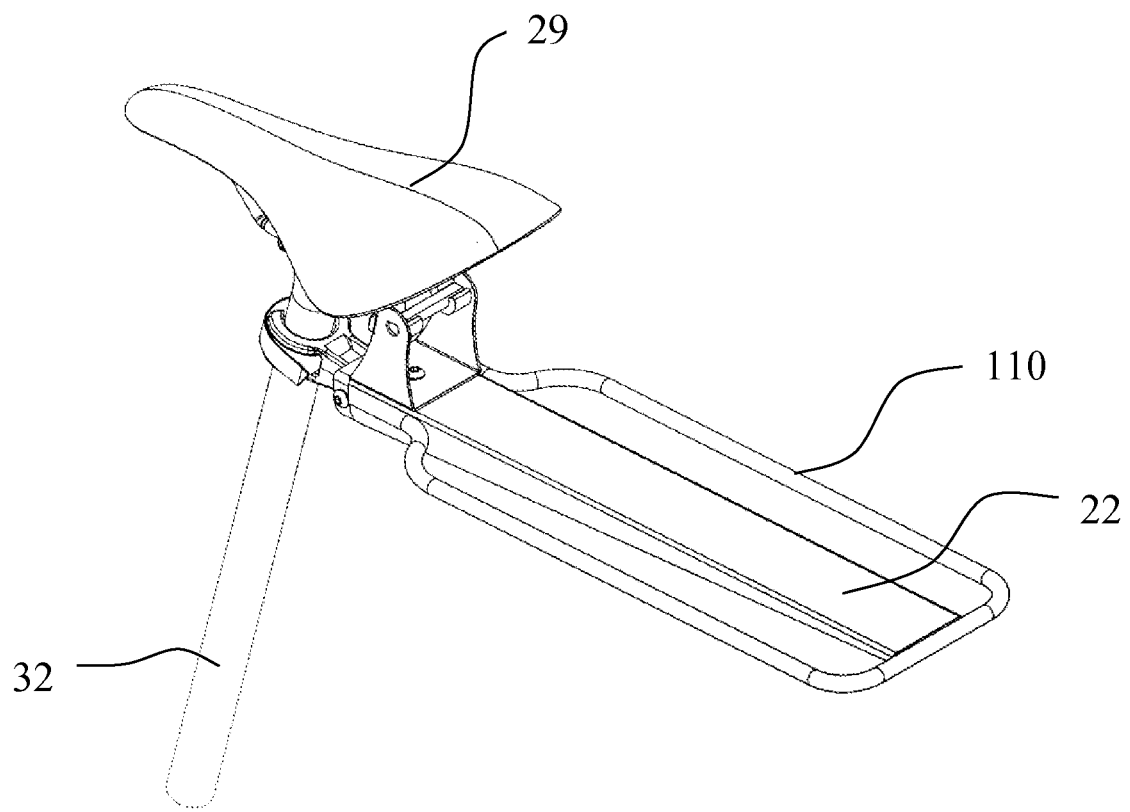
FIG. 7a is a three dimensional view of the bike rack of FIG. 1 showing a tubular rack frame connected to the rack platform.
Figure 7B:
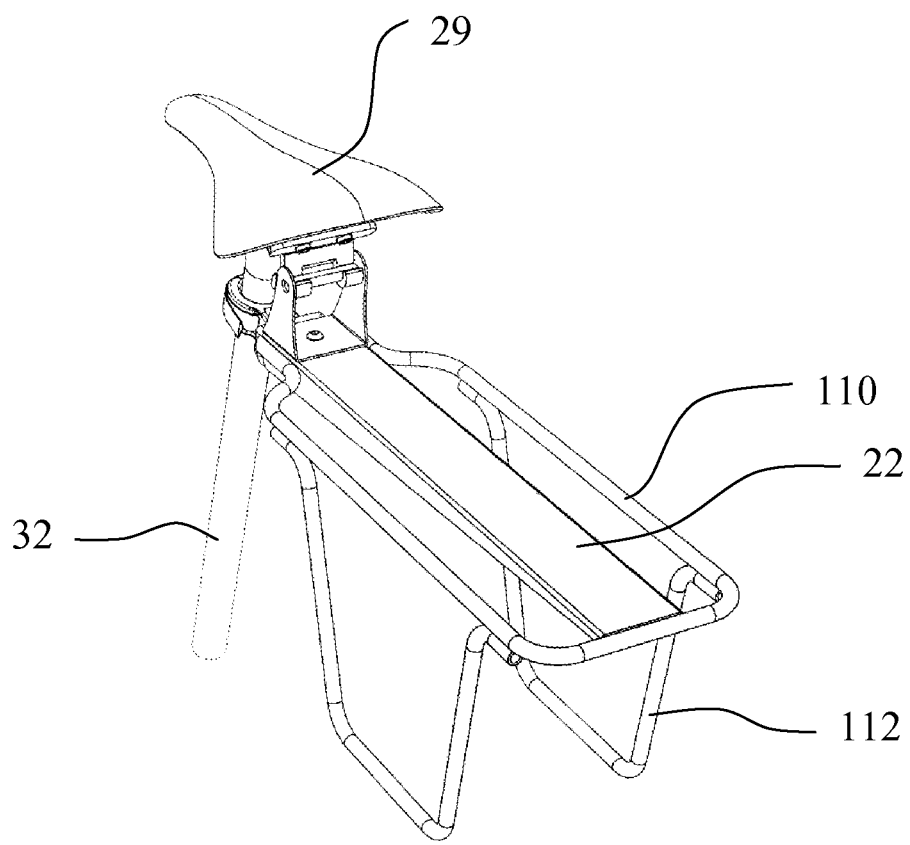
FIG. 7b is a three dimensional view of the bike rack of FIGS. 1 and 7a showing additional tubular members connected to the tubular rack frame to support and limit movement of bags that may be attached alongside the wheel of the bike.

In one embodiment, tubular rack frame 110 is connected to rack platform 22, providing additional width to cantilever bike rack 20 for supporting cargo, as shown in FIG. 5a and FIG. 7a. In one embodiment, additional tubular members 112 are connected to tubular rack frame 110 to support and limit movement of bags that may be attached along side the wheel of the bike, as shown in FIG. 7b.

Figure 8:
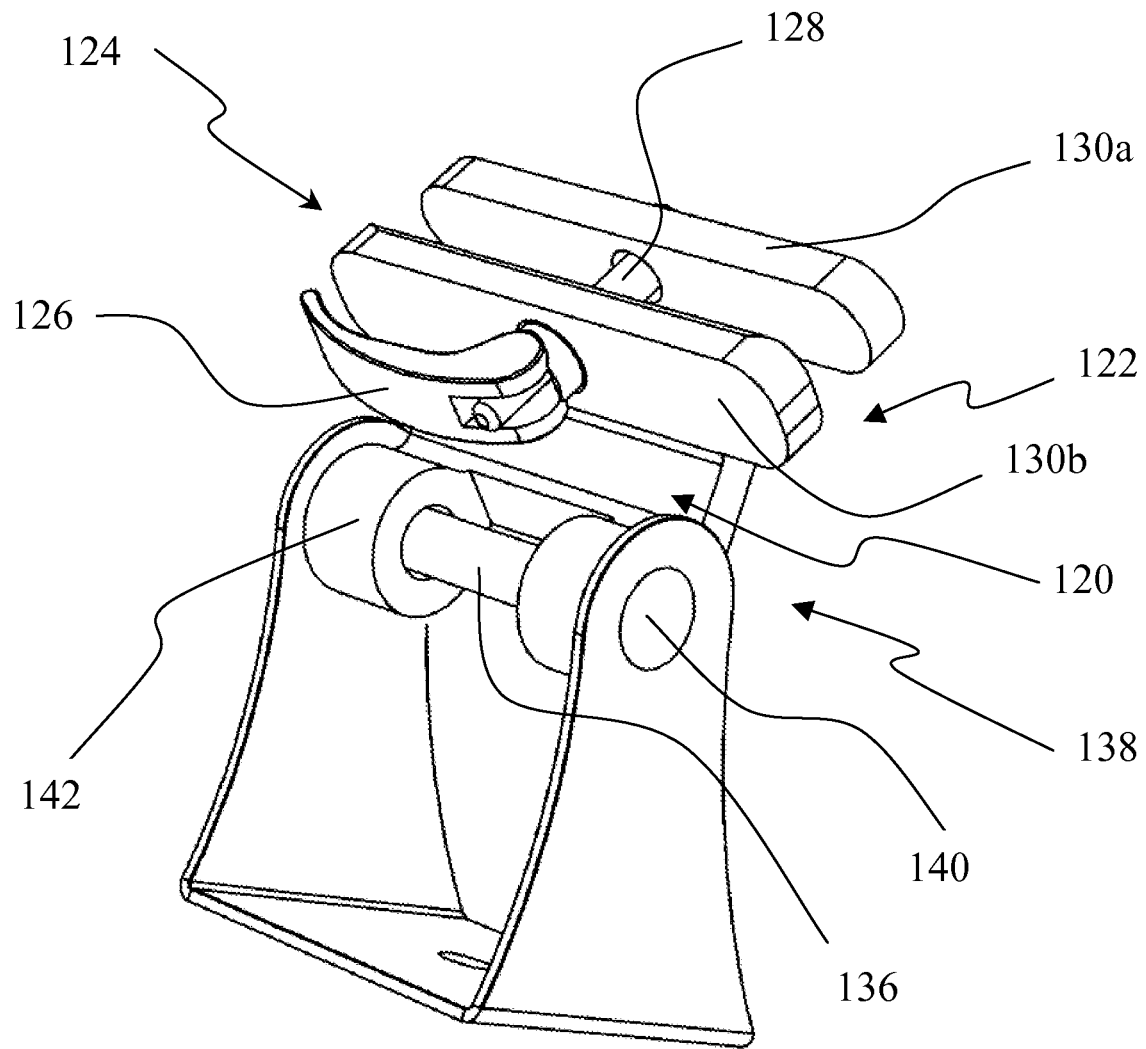
FIG. 8 is a three dimensional view of an embodiment of the bike rack with a quick release mounting of the rack platform to the seat rails and a fully enclosed rotatable member between the quick release mounting and the rack platform.
Figure 9:
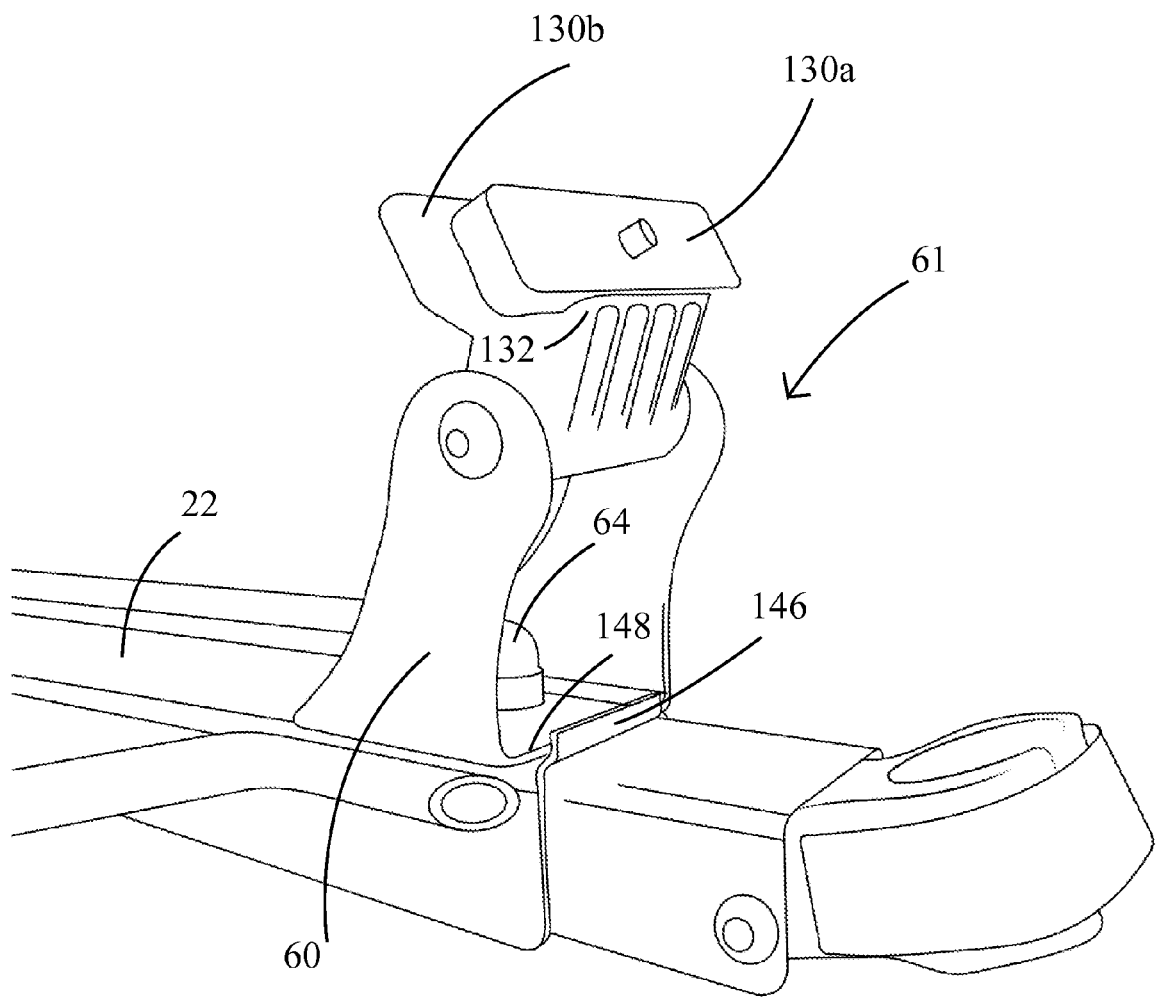
FIG. 9 is a three dimensional view of an embodiment of the bike rack of FIG. 8 with the forward end of the rack platform having a lip that permits replacing one pivot support member with another pivot support member having a different length side section.

In another embodiment quick release mechanism 120 provides for quickly mounting and dismounting all portions of the cantilever bike rack from the bike, as shown in FIG. 8. In this embodiment, one side of bracket 122 includes hand operated clamp 124 that provides the quick mounting to and dismounting from seat rails 28. Once single screw 128 is loosely tightened, turning handle 126 of hand operated clamp 124 tightens clamp 124. Hand operated clamp 124 has an eccentric part. As handle 126 is rotated, the eccentric part pushes against the head of the bolt inside the end of the handle, and this tightens the bolt altogether. In this embodiment, seat rail bracket clamp member 130a alone is rotated about 90 degrees so it can first slide between seat rails 28. Seat rail bracket clamp member 130a is then rotated 90 degrees in either direction so it is positioned above seat rails 28 while seat rail bracket clamp member 130b is positioned facing seat rail bracket clamp member 130a below seat rails 28. Handle 126 is then turned drawing seat rail bracket clamp members 130a, 130b together, tightening clamp 124. Velcro strap 90 is then inserted in the nylon loop, tightened, and connected to its Velcro mate. Alternatively, with hand operated clamp 124 loosened, platform 22 is twisted so one side of bracket clamp member 130a straddles over one of seat rails 28. Then platform 22 is twisted back so bracket clamp member 130a extends over the other seat rail 28. Abutment 132, extending from bracket clamp member 130b prevents rotation of bracket clamp member 130a during this operation, as shown in FIG. 9.

In this embodiment, the platform side of bracket 122 includes bearing 142 that extends around pin 136 of hinge 138. Hinge 138 can be completely cylindrical, as shown by end 140 of pin 136 in FIG. 8. Hinge 138 can have one or more bearings 142 that completely enclose corresponding sections of pin 136.

While if bolt 64 is sufficiently tightened with nut 65, rotation of rack around the axis of bolt 64 is avoided. However, applicants provided even greater resistance to such rotation by welding side sections 60 and front and back edges of bottom section 62 of pivot support member 61 to rack platform 22. Alternatively, rack platform 22 is modified to include lip 146 extending toward the front of the bike, as shown in FIG. 9. Lip 146 is bent upward when side portions of rack platform 22 are bent down. Front edge 148 of pivot support member 61 is mounted against lip 146 and this contact prevents rotation of rack 22 around the axis of bolt 64.

Eliminating welding, such as by providing lip 146, allows for replacement of pivot support member 61 with a different one having a different length side section 60. Thus, for a rider who raises the height of bike seat 29 a pivot support member 61 with longer side section 60 can be selected, allowing platform 22 to be lower and lowering the center of gravity of platform 22 and the load it is carrying, improving stability. Thus, for example pivot support member 61 can come with side section 60 having a length of 2 inches between platform 22 and pin 40, 136. Different pivot support members 61 can also be available with different side section lengths. For example pivot support members may be available with side section length of 3 inches, 4 inches, and 5 inches between platform 22 and pin 40. Thus, regardless of the height of seat post 32 and seat 29, rack 22 can remain low above the rear wheel of the bike.

Figure 10A:
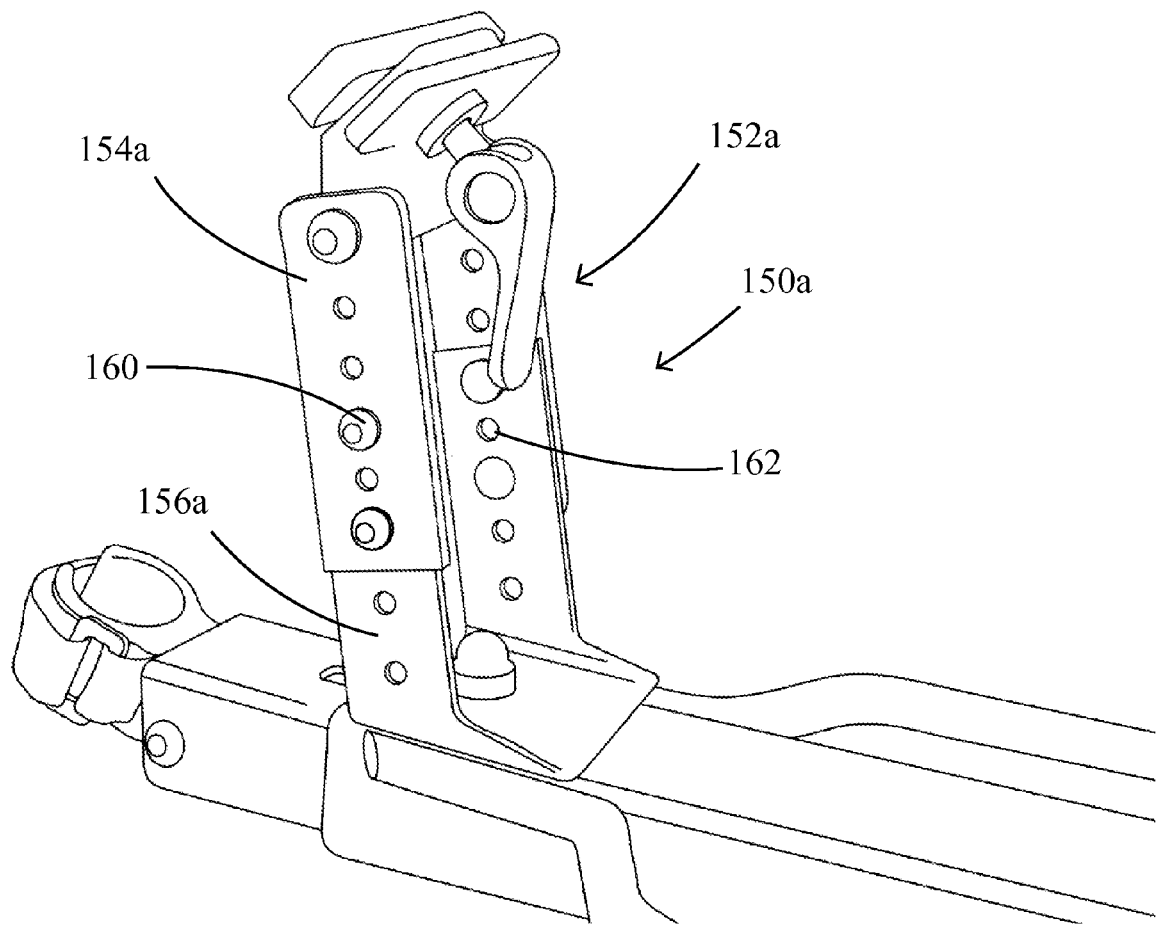
FIGS. 10a and 10b are three dimensional views of embodiments of the bike rack of FIG. 8 with variable length pivot support member side sections.
Figure 10B:
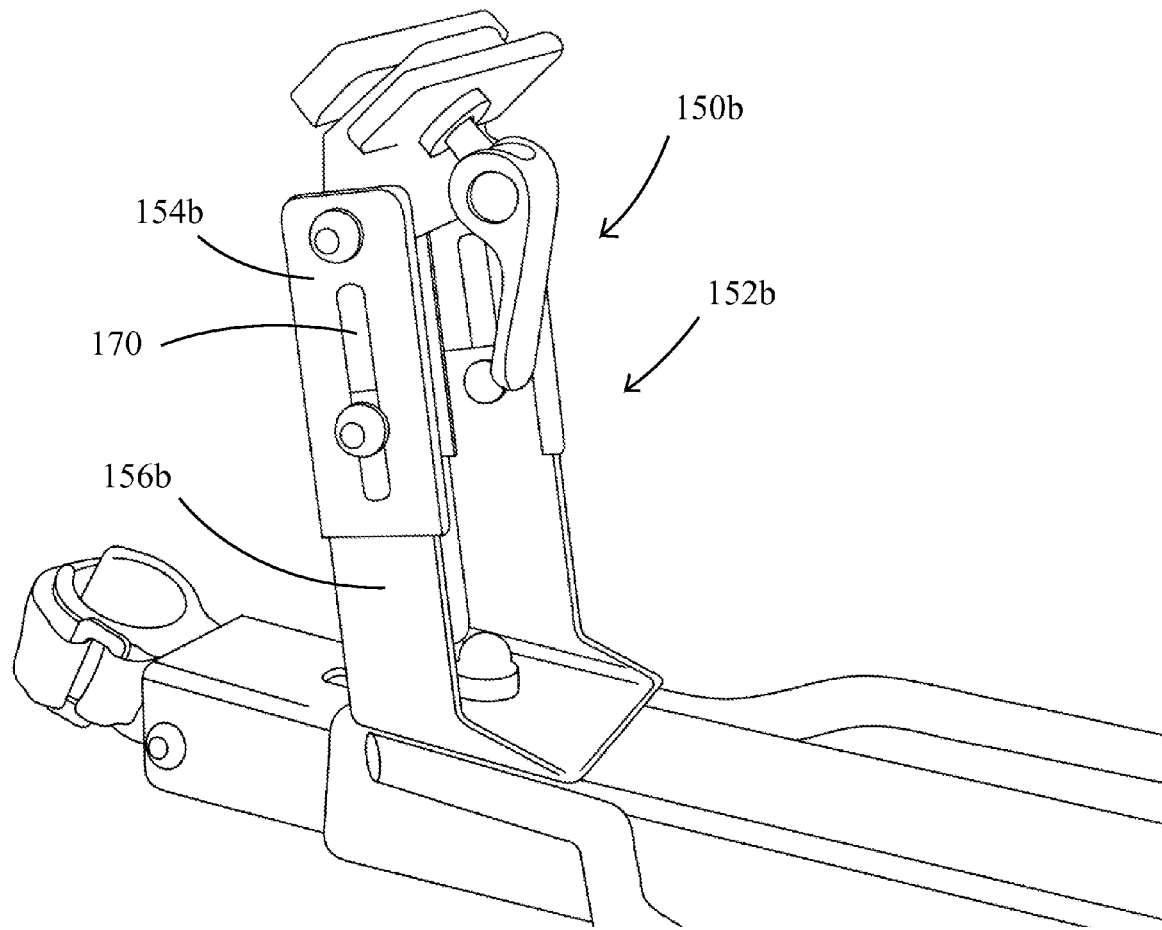

In other embodiments, pivot support member 150a, 150b with variable side section 152a, as shown in FIG. 10a or variable side section 152b, as shown in FIG. 10b can be used. In both the embodiments of FIG. 10a and that of FIG. 10b, variable length is achieved with two plates, with plate 154a, 154b connected to bracket 122 and plate 156a, 156b part of pivot support member 150a, 150b. Two bolts 160 are used to connect plates, 154a, 156a in FIG. 10a and a sufficient number of holes 162 is included in each plate 154a, 156a to provide a sufficient number of heights. Alternatively a slot can be provided in one of plates 154a, 156a, as shown with slot 170 in plate 154b in FIG. 10b. In addition, in the embodiment of FIG. 10b plate 154b wraps around top and sides of plate 156b providing additional stability during height adjustment.

Figure 11A:
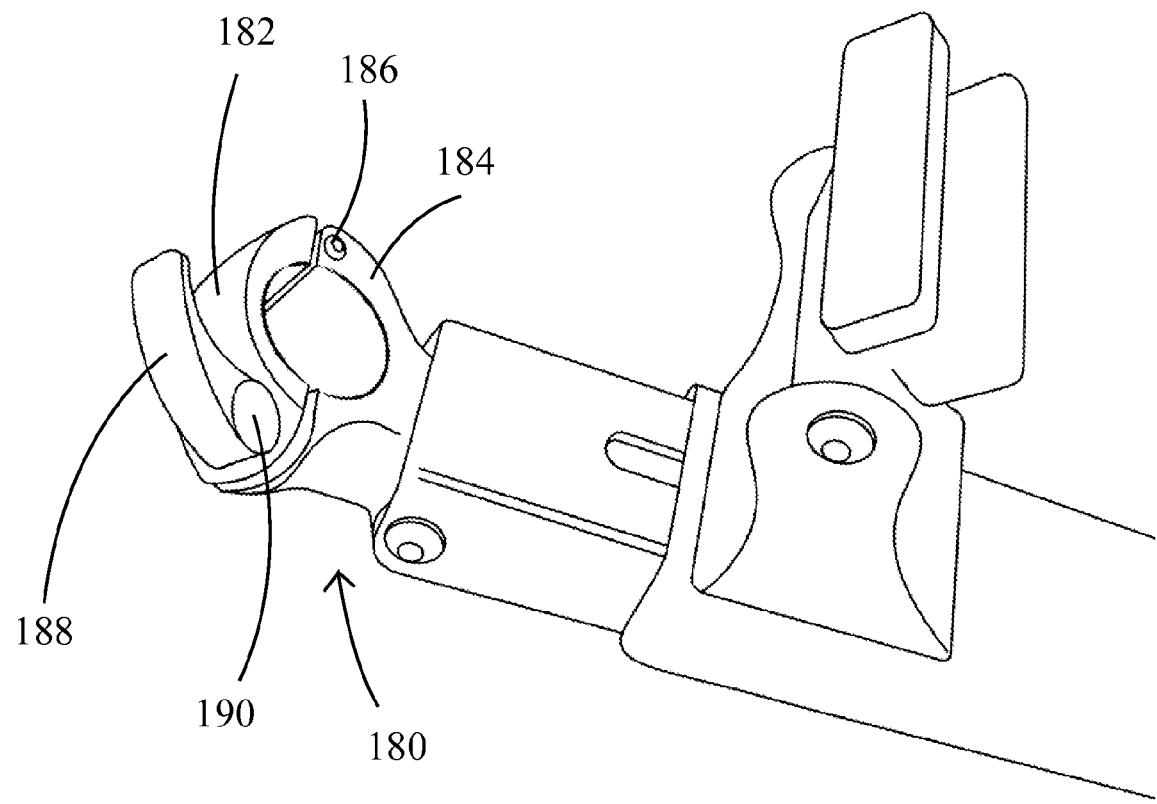
FIGS. 11a and 11b are three dimensional views of an embodiment of the bike rack of FIG. 8 with a quick release clamp for clamping the rack platform to the seat post.
Figure 11B:
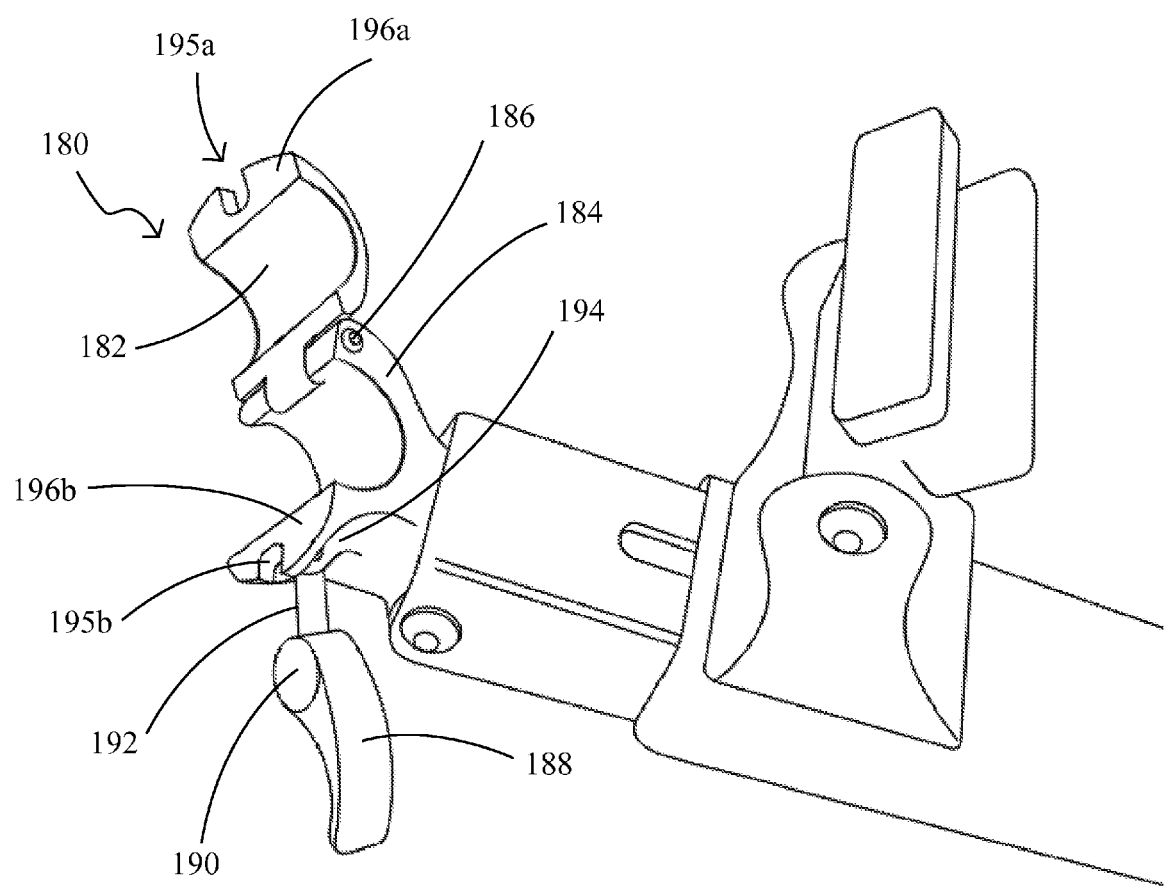

Illustrating another seat post clamp tightening scheme with a hand operated lever device is seat post bracket quick release clamp 180 shown in closed and open positions in FIGS. 11a, 11b. Seat post bracket quick release clamp 180 includes hinged half round front collar 182 and fixed rear collar 184 connected with front collar hinge 186. Seat post bracket quick release clamp 180 also includes hinged seat post bracket quick release lever 188 with cam controlled pressure device 190 for tightening. Seat post bracket quick release lever 188 is connected to fixed rear collar 184 with quick release lever pin 192 and hinge 194. When closed, quick release lever pin 192 extends through slots 195a, 195b in front portions 196a, 196b of front and rear collars 182, 184. Pushing down on seat post bracket quick release lever 188 adds pressure tightening connection. Pulling up on seat post bracket quick release lever 188 relieves pressure allowing quick release lever pin 192 to be removed from slots 195a, 195b and for front collar 182 to open, rotating around front collar hinge 186.

While illustrated and described in view of the embodiment of FIG. 8, lip 146 of FIG. 9, and the use of different side sections it allows, adjustable side sections 152a, 152b of FIGS. 10a, 10b, and quick release clamp 180 of FIGS. 11a, 11b can all be used with the embodiment of FIG. 1.

While the disclosed methods and systems have been shown and described in connection with illustrated embodiments, various changes may be made therein without departing from the spirit and scope of the invention as defined in the appended claims.

The invention claimed is:

1. A bike rack for a bike having a seat, the seat having seat rails extending along a bottom portion of the seat, the bike rack comprising:

a platform, a bracket including a platform side for connection to said platform at a junction therebetween, and a clamp configured for providing a clamped connection to said seat rails, the clamp having a first clamp member and a second clamp member with a gap therebetween with a section of both of the seat rails being in the gap, and at least one connector interconnecting the first clamp member and the second clamp member, the at least one connector being operable to reduce a size of the gap to anchor the clamp to the seat rails in a clamped condition, a seat post portion adapted to contact a seat post of the bike, a translation joint in the platform between the seat post portion and the platform to allow an adjustment of length between the seat post portion and said junction between the bracket and the platform, and a rotational joint defined by a circular pivot in at least one of the clamp, the bracket and the platform to allow a rotational adjustment between the platform and the seat when in said clamped condition about an axis generally transverse to a direction of the adjustment of length, whereby the rotational joint and the translational joint are arranged by said adjustment of length and said rotational adjustment to set the platform substantially horizontal for use.

2. A bike rack as recited in claim 1, wherein said platform is for carrying a load having a weight, wherein said seat bears most of the weight of the load.

3. A bike rack as recited in claim 2, wherein said seat bears substantially all of the weight of the load.

4. A bike rack as recited in claim 1, wherein the at least one connector is a hand operated quick connector.

5. A bike rack as recited in claim 1, wherein said bracket comprises a first part including the first clamp member and a second part connected to said platform, wherein said second part quickly and securely connects with said first part and wherein said second part quickly disconnects from said first part.

6. A bike rack as recited in claim 5, wherein said second part is permanently connected to said platform.

7. A bike rack as recited in claim 6, wherein said first part includes a bearing and wherein said second part includes a pin to form said rotational joint.

8. A bike rack as recited in claim 7, wherein said pin includes a key.

9. A bike rack as recited in claim 8, wherein key includes a flat region.

10. A bike rack as recited in claim 7, wherein said pin is configured so it can be inserted into said bearing when said platform is tilted in a first position and wherein said pin is configured so it is locked into said bearing when said platform is rotated to a second position.

11. A bike rack as recited in claim 1, wherein said seat post portion is a seat post clamp hingeably connected to said platform.

12. A bike rack as recited in claim 1, wherein the translation joint between said seat post portion and said platform comprises a slotted connector.

13. A bike rack as recited in claim 11, wherein said seat post clamp includes an open end for facilitating automatic extension of said seat post clamp around said seat post when said platform is rotated toward a substantially horizontal position by way of the rotational joint or when said translation joint extends the length between the platform and the seat post clamp.

14. A bike rack as recited in claim 11, wherein said seat post clamp includes a strap clamping member.

15. A bike rack as recited in claim 1, wherein said rotational joint includes a pin and a bearing in the bracket, wherein said pin has an axis, wherein said bearing extends completely around a portion of said axis.

16. A bike rack as recited in claim 15, wherein said rotational joint permits adjusting tilt of said platform around said axis, with said axis being substantially transverse to a direction of the translation joint.

17. A bike rack as recited in claim 15, further comprising a support member in the bracket between said rotational joint and said platform, wherein said support member can have a range of lengths for adjusting a separation distance between said rotational joint and said platform.

18. A bike rack as recited in claim 1, wherein said platform has an end facing forward when said platform is mounted on said bicycle, wherein said forward-facing end includes a lip for restricting rotation of said platform.

19. A bike rack as recited in claim 18, wherein said lip includes an upward-bent portion of said platform.

* * * * *